United States Patent [19]

Handly et al.

[11] 4,063,081
[45] Dec. 13, 1977

[54] COMPUTER APPARATUS

[75] Inventors: Robert J. Handly; Robert H. Douglas, both of Phoenix, Ariz.

[73] Assignee: Honeywell, Fort Washington, Pa.

[21] Appl. No.: 693,857

[22] Filed: June 8, 1976

[51] Int. Cl.$^2$ .................... G06F 9/20; G11C 29/00
[52] U.S. Cl. ................................. 235/312; 364/200
[58] Field of Search ............ 235/15 3 AM; 340/172.5

[56] References Cited

U.S. PATENT DOCUMENTS

| | | | |
|---|---|---|---|
| 3,340,539 | 9/1967 | Sims | 235/153 AM |
| 3,422,402 | 1/1969 | Sakalay | 340/172.5 |
| 3,579,199 | 5/1971 | Anderson et al. | 235/153 AM |
| 3,748,653 | 7/1973 | Debruyne et al. | 340/172.5 X |
| 3,794,818 | 2/1974 | Kennedy | 235/153 AM |
| 3,798,612 | 3/1974 | Struger et al. | 340/172.5 |
| 3,806,716 | 4/1974 | Lahti et al. | 235/153 AM |

OTHER PUBLICATIONS

Sherman, A. *Scheme for "Blowing" Fusible-links*, in IBM Tech. Disc. Bull. 14(10: pp. 3200-3201, Mar. 1972.

*Primary Examiner*—R. Stephen Dildine, Jr.

[57] ABSTRACT

A computer apparatus includes means for comparing the address stored in an address register with a preset address. When the stored address matches the preset address the comparison means issues an alarm signal which may be used to effect an immediate halt in the execution of a routine, trigger suitable annunciators or, selectively, to enable the injection into the routine of an overriding preset instruction.

6 Claims, 2 Drawing Figures

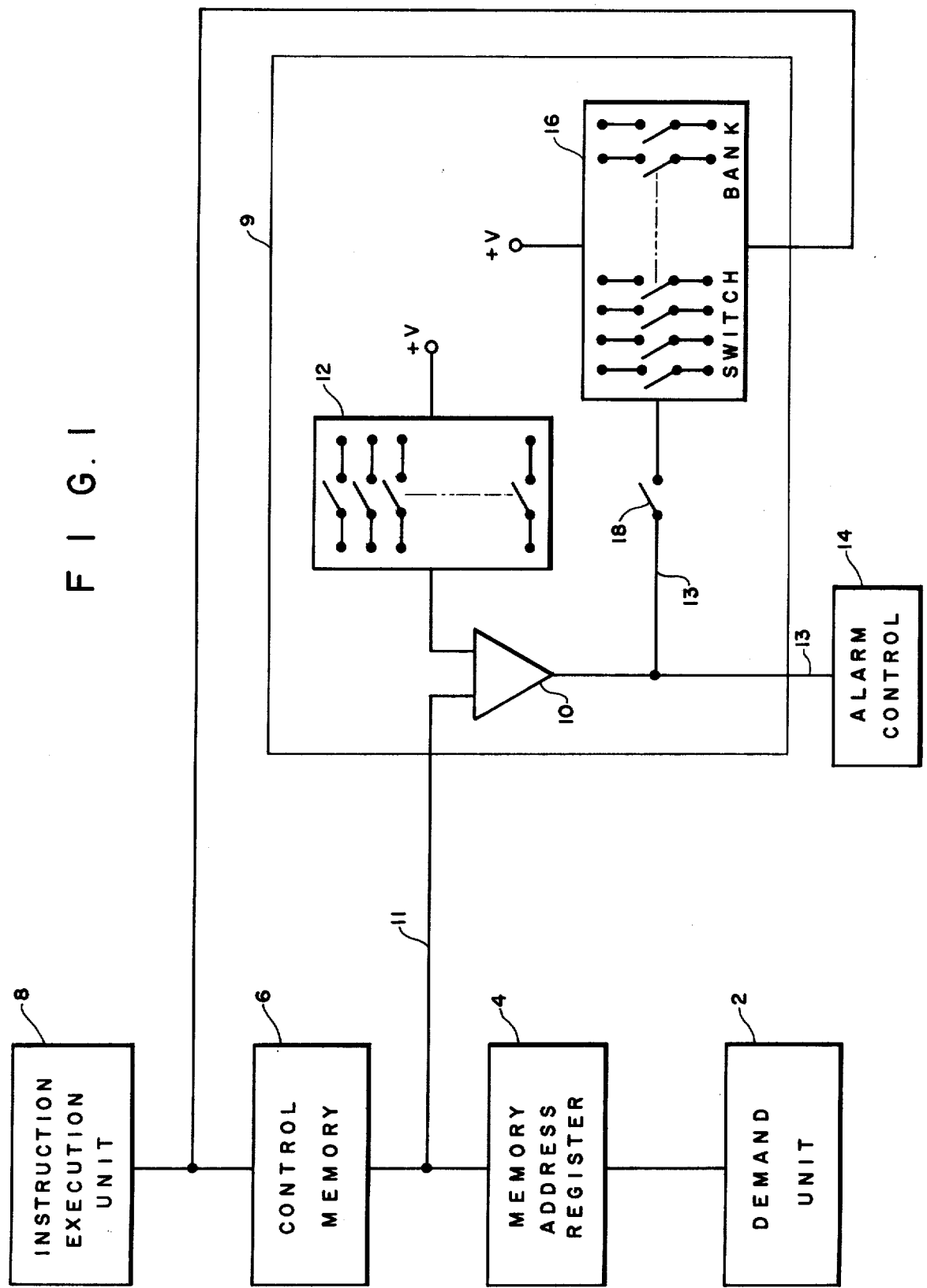

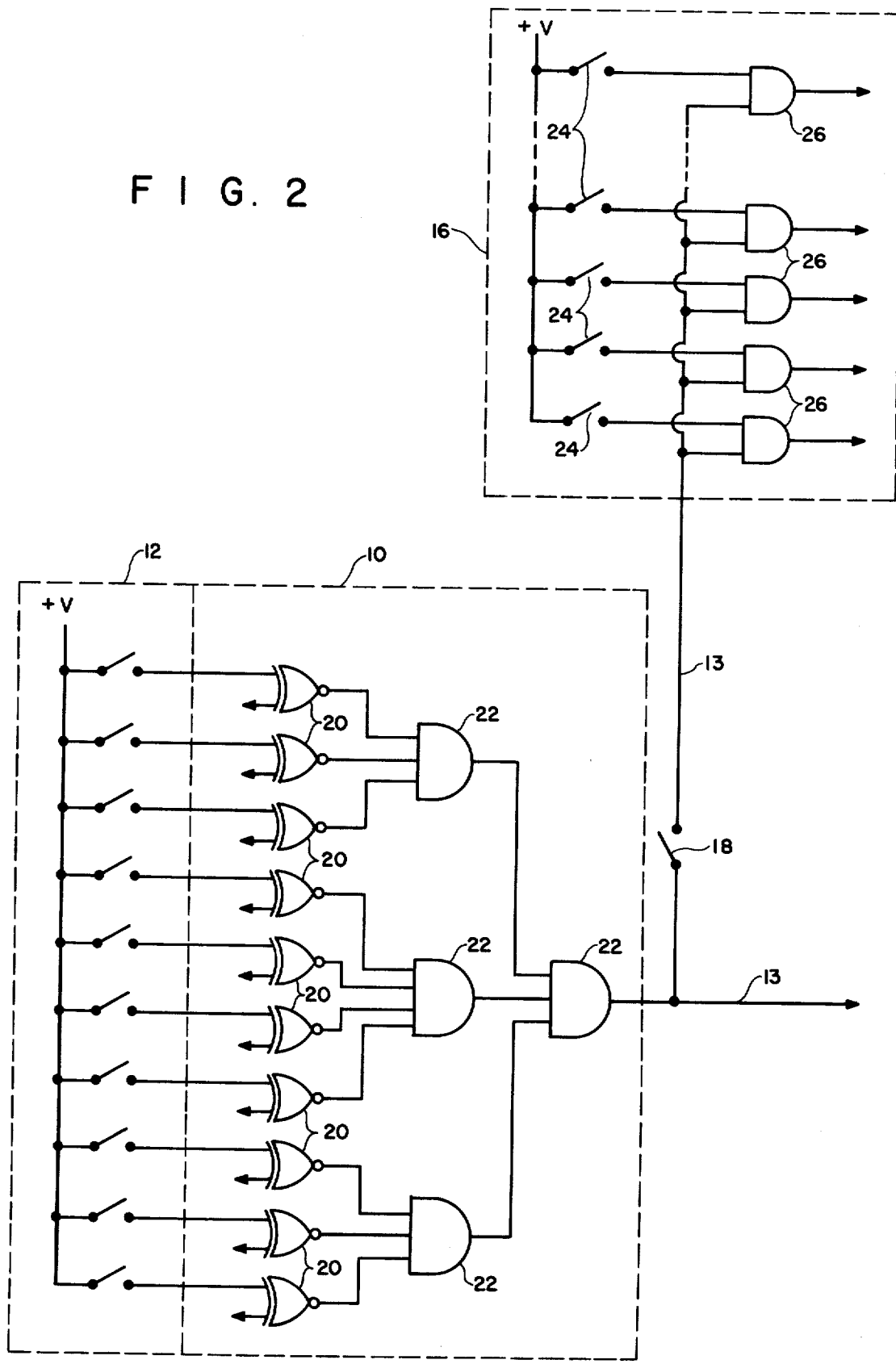

COMPUTER APPARATUS

BACKGROUND OF THE INVENTION

1. Field Of The Invention

The present invention relates to a computer apparatus, and more particularly to correcting and adjusting means for a data processor.

2. SUMMARY OF THE INVENTION

In the course of setting up and/or operating a digital computer, the successive process routines are directed by successive instructions which, for example, may be stored in a memory unit. Such instructions are called into operation by addressing the portion of the memory unit in which the desired instruction is stored. On occasion it may be desirable to override a particular instruction with a different instruction. Alternatively, in starting up a series of routines, there may be certain address identifications which represent either an invalid address in that routine or an address at which there is an improper instruction stored. Such errors may occur, for instance, in the establishment of a new system of routines and would appear in efforts to correct such a routine, known as "debugging."

It is, accordingly, and object of the present invention to provide an improved computer apparatus with means to facilitate instruction changes.

It is another object of the present invention to provide, in a computer apparatus, an improved alarm and correction means.

In accomplishing these and other objects, there has been provided, in accordance with the present invention, a computer apparatus including means for comparing the address stored in an address register with a preset address. When the stored address matches the preset address the comparison means issues an alarm signal which may be used to effect an immediate halt in the execution of a routine, trigger suitable alarm annunicators or, selectively, to enable the injection into the routine of an overriding preset instruction.

BRIEF DESCRIPTION OF THE DRAWINGS

A better understanding of the invention may be had from the following detailed description when read in the light of the accompanying drawings, in which:

FIG. 1 is a block schematic diagram of the computer apparatus embodying the present invention, and FIG. 2 is a logic block diagram of elements suitable for use in the appartus shown in FIG. 1.

DETAILED DESCRIPTION

Referring now to the drawing in more detail, there is shown, in FIG. 1, in block diagram form, several basic elements of a computer system. For example there is shown a Demand Unit 2 which may be a part of any of the several operational components of a computer which issues a demand or request for instructions in the performance of a routine. The demand or request may be in the form of an address, which address is logged into a Memory Address Register 4. Under ordinary circumstances, the address stored in the Memory Address Register 4 is applied to a Memory Unit 6 in which are stored a number of instructions which may be called out by the address from the Register 4 and imposed upon an Instruction Execution Unit 8. It will be appreciated that the Instruction Execution Unit 8 and the Demand Unit 2 may, in fact, be separate parts of a single operational unit of the computer. On the other hand, they may be entirely separate units. In either event, however, the Instruction Execution Unit performs an indicated operation in response to the applied instructions.

There is also provided an Address Monitoring Structure 9 comprising a Comparator 10 and a bank of presettable switches 12. The Comparator 10 symbolically represents means for comparing a plurality of digital bits from the Memory Address Register 4 with a corresponding number of digital bits established by the switch bank or Reference Signal Unit 12. A cable 11 including a number of leads corresponding to the number of bits in the Address Signal interconnects the Address Register 4 with the Monitor 9. When the Comparator 10 detects an identity between the digital indication of the address from the Register 4 and the digital indication of the preset number established by the Reference Signal Unit 12, an output signal is produced which is applied, by way of a lead 13, to an Alarm Control Unit 14. When the Alarm Control Unit 14 is triggered by a signal from the Comparator 10, and depending upon the selective organizational arrangement of the computer apparatus, suitable alarm annunicators or external test equipment may be energized to indicate that the alarm condition has occurred. Alternatively of coincidentally the operation of the computer apparatus may be stopped to allow an analysis of the alarm condition. Further, there is provided an auxiliary or Control Signal Unit 16 including a relatively large number of switches which may be preset to establish a predetermined control signal or instruction word or words. A switch 18 interconnects the output of the Comparator 10 to the Control Signal Unit 16. Whenever the switch 18 is closed and the Comparator 10 issues an alarm signal, the Control Signal Unit 16 is enabled to transmit the preset instruction word. That instruction word is, in turn, applied to the Instruction Execution Unit 8 to override the instruction word that ordinarily would have been applied from the selected address in the Instruction Memory 6.

In an actual embodiment of the present invention, the memory address was in the form of a 10 bit word. The instruction memory was 48 bits wide and implemented in non-alterable Read-Only Memory, making normal memory changes difficult. The primary use of the invention in the actual embodiment was to temporarily alter the program by "injecting" an instruction from the Control Signal Unit 16 at the location determined by the Reference Signal 12.

Accordingly, and as illustrated in FIG. 2, the Reference Signal Unit 12 included a group of 10 switch members each of which may be selectively closed to establish a preset digital word or reference signal is compared with the digital word from the Address Register 4. The preset address word established by the selective closure of the switches of the Reference Signal Unit 12 may represent an invalid address for the given routine, an address containing an improper instruction, or an address at which the instruction is to be overriddened by a new instruction. In either event the Comparator 10 continuously monitors the address logged in the Address Register 4. When the Comparator 10 detects an identity between the address stored in the Register 4 and the preset address from the Reference Signal Unit 12, an output signal is generated which actuates the Alarm Control Unit 14.

In FIG. 2 the Comparator 10 is shown, by way of example, as ten EXCLUSIVE NOR gates 20, corresponding in number to the ten selectively actuated switches of the Reference Signal Unit 12. One input terminal of each of the ten EXCLUSIVE NOR gates 20 is connected to a corresponding one of the ten preset switches. The other input terminal of each of the ten EXCLUSIVE NOR gates 20 is connected to a corresponding one of the leads 11 from the Memory Address Register 4. The output signals from the ten EXCLUSIVE NOR gates 20 are ANDED together as by the AND gates 22 to provide a output signal when the address signal is identical, bit-by-bit, to the reference signal. As previously mentioned, the alarm control circuit 14 actuates any or several of a number of different type of alarm responses.

Again, in the previously mentioned embodiment of the present invention and as shown in FIG. 2 the Control Signal Unit 16 includes, by way of example, the bank of forty eight selectively actuated switch elements 24, and a corresponding number of AND gates 26. One input terminal of each of the AND gates 26 is connected to a corresponding one of the switch elements 24. The other input terminal of each of the AND gates is connected, in common, to the output lead 13 from the Comparator 10. Thus, the several switch elements 24 may be selectively preset to desired digital control word signal, that word or signal being issued out of the unit 16 when the AND gates are enabled by the output signal from the Comparator 10. That control word or signal when issued, becomes an instruction of forty eight bits for the Instruction Execution Unit 8. That instruction may be any instruction which the Instruction Execution Unit 8 is capable of performing. This instruction may constitute a correction of an erroneous instruction or may include an instruction to return to an earlier instruction, a routine causing the system to recirculate the operation for testing purposes.

Thus there has been provided, in accordance with the present invention, an improved computer apparatus which features an improved alarm and correction means, and means to facilitate instruction changes.

The embodiments of the invention in which an exclusive property or privilege is claimed are defined as follows:

1. In a computer apparatus including means for producing a digital signal to be monitored, a signal monitoring means comprising:
   selectively settable reference control means or establishing a preset digital reference signal,
   digital comparator means for comparing said reference signal with said signal to be monitored, said comparator means being responsive to an identity between said compared signals to produce an output signal,
   alarm control means responsive to said output signal from said comparator means for actuating alarm condition means in said computer apparatus, and
   selectively settable control signal means for producing a preset digital control signal for said computer apparatus in response to said output signal from said comparator means.

2. In a computer apparatus including means for producing a digital signal to be monitored, a signal monitoring means comprising:
   selectively settable reference control means for establishing a preset digital reference signal, said reference control means including a plurality of switch means which may be individually set to establish said preset digital reference signal,
   digital comparator means for comparing said reference signal with said signal to be monitored, said comparator means being responsive to an identity between said compared signals to produce an output signal,
   alarm control means responsive to said output signal from said comparator means for actuating alarm condition means in said computer apparatus, and
   selectively settable control signal means for producing a preset digital control signal for said computer apparatus in response to said output signal from said comparator means.

3. In a computer apparatus including means for producing a digital signal to be monitored, a signal monitoring means comprising:
   selectively settable reference control means for establishing a preset digital reference signal, said reference control means including a plurality of switch means which may be individually set to establish said preset digital reference signal,
   digital comparator means for comparing said reference signal with said signal to be monitored, said comparator means being responsive to an identity between said compared signals to produce an output signal,
   alarm control means responsive to said output signal from said comparator for actuating alarm condition means in said computer apparatus, and
   selectively settable control signal means for producing a preset digital control signal for said computer apparatus in response to said output signal from said comparator means, said control means including a plurality of switch means which may be individually set to produce said preset control signal.

4. The monitoring means as set forth in claim 3 wherein said control signal means further includes gating means for gating said control signals out of said control signal means.

5. The monitoring means as set forth in claim 4 wherein said gating means is enabled by said output signal from said comparator means.

6. A computer apparatus comprising:
   an instruction execution unit responsive to an instruction word applied thereto to execute the indicated instruction,
   an addressable memory unit for storing instruction words for said execution unit,
   a demand unit for generating an address signal to identify a particular instruction in said memory unit,
   a register for temporarily storing the address signal generated by said demand unit,
   means for applying said address signal to said addressable memory units to call forth a particular instruction for said execution unit,
   signal monitoring means for monitoring the address signal stored in said register, said signal monitoring means including selectively settable reference control means to establish a preset digital reference signal, digital comparator means for comparing said reference signal with said address signal stored in said register, said comparator being responsive to an identity between said compared signals to produce a comparator output signal, and selectively settable control signal means responsive to said comparator output signal for producing a preset digital control signal,
   and means for applying said preset control signal to said instruction execution unit as an instruction in lieu of an instruction from said addressable memory unit whenever said comparator detects an identity between said compared signals.

* * * * *